(12) United States Patent
Chiang et al.

(10) Patent No.: US 12,149,643 B2
(45) Date of Patent: Nov. 19, 2024

(54) DEVICE SIGNATURE BASED ON TRIM AND REDUNDANCY INFORMATION

(71) Applicant: Taiwan Semiconductor Manufacturing Co., Ltd., Hsinchu (TW)

(72) Inventors: Katherine H. Chiang, New Taipei (TW); Shih-Lien Linus Lu, Hsinchu (TW)

(73) Assignee: Taiwan Semiconductor Manufacturing Co., Ltd., Hsinchu (TW)

(*) Notice: Subject to any disclaimer, the term of this patent is extended or adjusted under 35 U.S.C. 154(b) by 0 days.

(21) Appl. No.: 18/515,613

(22) Filed: Nov. 21, 2023

(65) Prior Publication Data

US 2024/0089126 A1    Mar. 14, 2024

Related U.S. Application Data

(63) Continuation of application No. 17/174,948, filed on Feb. 12, 2021.

(51) Int. Cl.
*G06F 21/00* (2013.01)
*H04L 9/06* (2006.01)
(Continued)

(52) U.S. Cl.
CPC .......... *H04L 9/3278* (2013.01); *H04L 9/0643* (2013.01); *G11C 11/418* (2013.01); *G11C 11/419* (2013.01)

(58) Field of Classification Search
None
See application file for complete search history.

(56) References Cited

U.S. PATENT DOCUMENTS

| 5,995,413 A | 11/1999 | Holzmann et al. |
| 9,018,972 B1 | 4/2015 | Gurrieri et al. |

(Continued)

FOREIGN PATENT DOCUMENTS

| TW | 201941066 A | 10/2019 |
| WO | WO-03081896 A1 | 10/2003 |

OTHER PUBLICATIONS

Hou, S., Deng, D., Wang, Z. et al. A dynamically configurable LFSR-based PU F design against machine learning attacks. CCF Trans. HPC 3, 31-56 (2021).

(Continued)

*Primary Examiner* — Jeffery L Williams
(74) *Attorney, Agent, or Firm* — Sterne, Kessler, Goldstein & Fox P.L.L.C.

(57) ABSTRACT

The present disclosure describes embodiments of a device with memory and a processor. The memory is configured to store integrated circuit (IC) trim and redundancy information. The processor is configured to extract bits from the IC trim and redundancy information, perform a hashing function on the extracted bits to generate hashed bits, and in response to statistical properties of the hashed bits meeting one or more criteria, output the hashed bits. In some embodiments, the memory that stores the IC trim and redundancy information can be different from other memory used by the device for other operations (e.g., accessing user data and program data that have been written into system memory).

20 Claims, 11 Drawing Sheets

(51) Int. Cl.
*H04L 9/32* (2006.01)
*G11C 11/418* (2006.01)
*G11C 11/419* (2006.01)

(56) References Cited

U.S. PATENT DOCUMENTS

| | | | |
|---|---|---|---|
| 9,501,664 | B1 | 11/2016 | Hamlet |
| 9,870,829 | B2 | 1/2018 | Park et al. |
| 10,664,623 | B2 | 5/2020 | Wang et al. |
| 10,884,851 | B2 | 1/2021 | Yang |
| 11,005,669 | B2 * | 5/2021 | O'Connell ............ H04L 9/3278 |
| 11,082,241 | B2 | 8/2021 | Sachdev et al. |
| 11,152,052 | B1 | 10/2021 | Morishita et al. |
| 11,171,793 | B2 | 11/2021 | Schat |
| 11,243,744 | B2 | 2/2022 | Näslund et al. |
| 11,545,210 | B2 | 1/2023 | Morishita et al. |
| 11,567,682 | B2 | 1/2023 | Luo et al. |
| 2005/0172130 | A1 | 8/2005 | Roberts |
| 2006/0282652 | A1 | 12/2006 | El-Haj-Mahmoud et al. |
| 2015/0026545 | A1 | 1/2015 | Yu et al. |
| 2015/0188717 | A1 | 7/2015 | Wu et al. |
| 2015/0262653 | A1 | 9/2015 | Chu et al. |
| 2015/0278551 | A1 | 10/2015 | Lyer et al. |
| 2016/0093393 | A1 | 3/2016 | Park et al. |
| 2017/0011810 | A1 | 1/2017 | Tran et al. |
| 2017/0323682 | A1 | 11/2017 | Tran et al. |
| 2018/0076957 | A1 | 3/2018 | Watanabe et al. |
| 2019/0036706 | A1 | 1/2019 | Detert |
| 2019/0042480 | A1 | 2/2019 | Khatib Zadeh et al. |
| 2019/0347447 | A1 | 11/2019 | Tomita |
| 2020/0235735 | A1 | 7/2020 | Plusquellic et al. |
| 2020/0396069 | A1 | 12/2020 | Kwak et al. |
| 2020/0402589 | A1 * | 12/2020 | Lu ........................ H04L 9/3247 |
| 2021/0026603 | A1 | 1/2021 | Wu et al. |
| 2021/0142832 | A1 | 5/2021 | Lin et al. |
| 2021/0184871 | A1 | 6/2021 | Kim |
| 2021/0264014 | A1 | 8/2021 | Wu et al. |
| 2021/0312051 | A1 * | 10/2021 | Kloth ................... G06F 9/4406 |
| 2021/0390999 | A1 | 12/2021 | Morishita et al. |
| 2022/0263667 | A1 | 8/2022 | Chiang et al. |
| 2022/0293141 | A1 | 9/2022 | Lin et al. |
| 2024/0086319 | A1 * | 3/2024 | Morgan ............. G06F 12/0292 |
| 2024/0089126 | A1 * | 3/2024 | Chiang ................. G11C 29/50 |

OTHER PUBLICATIONS

Office Action issued in related Taiwanese Application 111104235.A, dated Sep. 13, 2024; 1 page.

* cited by examiner

DEVICE SIGNATURE BASED ON TRIM AND REDUNDANCY INFORMATION

CROSS REFERENCE TO RELATED APPLICATION

This application is a continuation of U.S. patent application Ser. No. 17/174,948, titled "Device Signature Based on Trim and Redundancy Information," which was filed on Feb. 12, 2021 and is incorporated herein by reference in its entirety.

BACKGROUND

Physical unclonable functions (PUF) apply a measurable intrinsic randomness of physical devices to establish signatures for those devices. PUFs can be used in integrated circuit (IC) devices, where a repeated PUF measurement of a given IC device results in the same (or very similar) PUF response each time. However, due to manufacturing variations, a PUF measurement of another IC device results in a significantly different PUF response. The different PUF responses among the IC devices can be leveraged to create unique device signatures (or identification).

BRIEF DESCRIPTION OF THE DRAWINGS

Aspects of the present disclosure are best understood from the following detailed description when read with the accompanying figures. It is noted that, according to the standard practice in the industry, various features are not drawn to scale. In fact, the dimensions of the various features may be arbitrarily increased or reduced for clarity of discussion.

DETAILED DESCRIPTION

Figure 1:
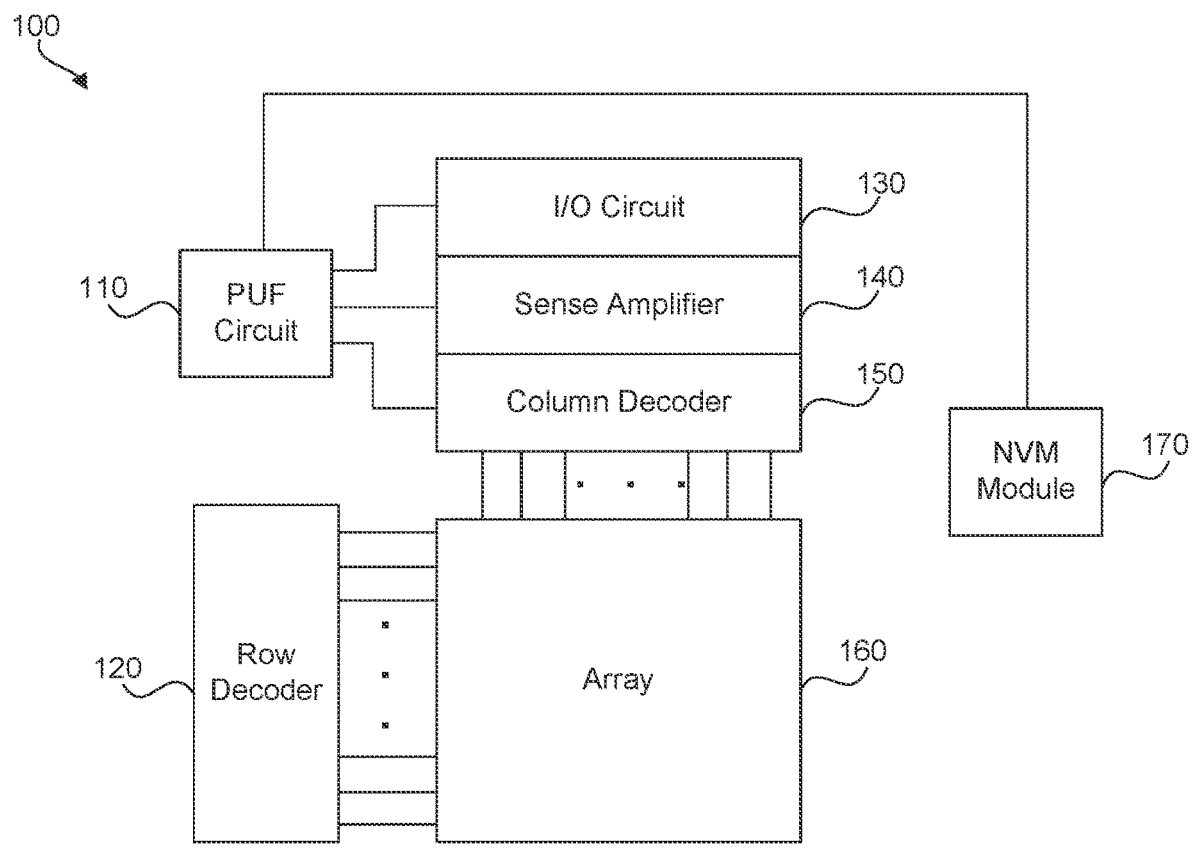
FIG. 1 is an illustration of a memory device with a physical unclonable function (PUF) circuit, according to some embodiments of the present disclosure.

The following disclosure provides many different embodiments, or examples, for implementing different features of the provided subject matter. Specific examples of components and arrangements are described below to simplify the present disclosure. These are merely examples and are not intended to be limiting. In addition, the present disclosure repeats reference numerals and/or letters in the various examples. This repetition is for the purpose of simplicity and clarity and, unless indicated otherwise, does not in itself dictate a relationship between the various embodiments and/or configurations discussed.

The following disclosure describes aspects of an integrated circuit (IC) device with a physical unclonable function (PUF) circuit. For explanation purposes, the IC device described herein is a memory device, such as a static random access memory (SRAM) device, a dynamic RAM, a resistive RAM, a magnetoresistive RAM, and a ferroelectric RAM. Certain memory device elements are disclosed to facilitate in the description of the different embodiments herein. The memory device can include other circuit elements, which are within the spirit and scope of the present disclosure. Further, the embodiments described herein are not limited to memory devices and can be applied to other IC devices (e.g., processors and application-specific integrated circuits (ASICs)). These other IC devices are within the spirit and scope of the present disclosure.

In some embodiments, the PUF circuit is configured to generate an output (also referred to herein as a "device signature") based on unique trim and redundancy information associated with the IC device. The IC trim and redundancy information can be based on one or more of input/output (I/O) circuit repair information, sense amplifier trim information, a physical address associated with a repaired wordline in a memory device, a physical address associated with a repaired bitline in the memory device, analog-to-digital converter trim information, digital-to-analog trim information, sensor trim information, any other IC trim and redundancy information, or a combination thereof, according to some embodiments. Based on the IC device's trim and redundancy information, a unique device signature (or identification) can be generated for the IC device. A benefit of the embodiments described herein, among others, is the low overhead of the PUF circuit since the information used to generate the device signature is based on existing IC trim and redundancy information unique to the IC device. Further, the reliable read-out and repeatability of the information are already covered in existing circuit design as the information is critical to the correct operation of the IC device.

FIG. 1 is an illustration of a memory device 100, according to some embodiments of the present disclosure. In some embodiments, memory device 100 can be an SRAM device, which includes a PUF circuit 110, a row decoder 120, an I/O circuit 130, a sense amplifier 140, a column decoder 150, a memory array 160, and a non-volatile memory (NVM) module 170.

Memory array 160 includes memory cells arranged in rows and columns that are accessed—e.g., for memory read and write operations—using a memory address. Based on the memory address, row decoder 120 selects a row of memory cells to access. Also, based on the memory address, column decoder 150 selects a column of memory cells to access. For a memory read operation, sense amplifier 140 senses a voltage on a selected column (e.g., selected bitline of an SRAM array). I/O circuit 130 can provide a digital representation of the sensed voltage from sense amplifier 140 to an external circuit (not shown in FIG. 1). Other memory operations—e.g., memory write operation—can be performed using row decoder 120, I/O circuit 130, sense amplifier 140, column decoder 150, and memory array 160. These other memory operations are within the spirit and scope of the present disclosure.

The semiconductor manufacturing process can have variations that cause memory device 100 to operate differently than designed and/or that cause portions of memory device 100 to be defective and non-operational. These semiconductor manufacturing process variations and defects can be detected during IC testing. For example, during IC testing, memory device 100 can receive various electrical test signals to compare memory device 100's output signals to expected values and performance metrics. The tests can identify portions of memory device 100 that do not have optimal operation and/or portions of memory device 100 that are defective and non-operational.

With respect to the semiconductor manufacturing process variations, in an example, variations in a layer deposition or a curing process can cause certain layers of memory device 100 to have higher or lower resistance than intended. As a result, operating characteristics (e.g., operating voltages and device performance) of manufactured memory device 100 can be different from an intended design. To address these semiconductor manufacturing process variations, memory device 100 can incorporate one or more trim circuits to adjust memory device 100's operating characteristics after manufacture.

In some embodiments, sense amplifier 140 can include a trim circuit (also referred to as "a sense amplifier trim circuit"; not shown in FIG. 1). The sense amplifier trim circuit can be used to adjust a reference current used by sense amplifier 140 by, for example, activating additional current source transistors to increase the reference current. As a result, an output of sense amplifier 140 can be tuned to a desirable operating point. The sense amplifier trim information for sense amplifier trim circuit can be stored in NVM module 170 as sense amplifier trim code, according to some embodiments.

Though not illustrated in FIG. 1, memory device 100 can include other circuits with trim circuits. These other circuits include an analog-to-digital (A/D) converter, a digital-to-analog (D/A) converter, and a sensor. The A/D converter can be used to convert analog voltages used by memory device 100 to a digital format. Conversely, the D/A converter can be used to convert digital voltages used by memory device 100 to an analog format. Further, the sensor can be used by memory device 100 to measure, for example, a temperature of the device to ensure that memory device 100 operates in a safe thermal zone or to adjust temperature-dependent trim accordingly.

In some embodiments, the A/D converter, D/A converter, and sensor can include trim circuits (also referred to herein as "an A/D converter trim circuit," "a D/A converter trim circuit," and "a sensor trim circuit," respectively). The trim circuits can be used to tune the A/D converter, D/A converter, and sensor so these circuits operate in an accurate manner. For example, the A/D and D/A converters can each include a resistor ladder network used to generate digital and analog outputs. The A/D and D/A converter trim circuits can be used to trim the resistor ladder networks in the A/D and D/A converters, respectively, for accuracy. With regard to the sensor, using the sensor trim circuit, a temperature measurement of the sensor can be compared to a reference temperature to calibrate the sensor. The A/D converter trim information, D/A converter trim information, and sensor trim information can be stored in NVM module 170 as A/D converter trim code, D/A converter trim code, and sensor trim code, respectively, according to some embodiments.

NVM module 170 can include, for example, non-volatile memory cells (e.g., Flash memory cells, eFuse, etc.) to store the sense amplifier trim code, A/D converter trim code, D/A converter trim code, and sensor trim code when memory device 100 is either powered-up or powered-down. In some embodiments, memory device 100 can access the sense amplifier trim code, A/D converter trim code, D/A converter trim code, and/or sensor trim code in NVM module 170 upon power-up. In some embodiments, NVM module 170 can be dedicated to storing the trim code information—e.g., NVM module 170 is separate and independent from memory array 160.

In addition to semiconductor manufacturing process variations, portions of manufactured memory device 100 can be defective and/or non-operational. In some embodiments, memory device 100 can include redundancy circuits to replace these defective portions, without the need to dispose of the device. For example, I/O circuit 130 and memory array 160 can each include redundancy circuits (not shown in FIG. 1) to replace defective I/O's and wordlines, respectively. In some embodiments, when activating replacement I/O's and wordlines from the redundancy circuits, an address mapping of memory device 100 is updated to incorporate the replacement I/O's and wordlines. Information associated with the updated address mapping can be stored in NVM module 170, according to some embodiments. In some embodiments, memory device 100 can access the updated address mapping information in NVM module 170 upon power-up. In some embodiments, NVM module 170 can be dedicated to storing the address mapping information and/or the trim code information described above—e.g., NVM module 170 is separate and independent from memory array 160.

In some embodiments, to generate a unique device signature for memory device 100, PUF circuit 110 can use trim code (e.g., sense amplifier trim code, A/D converter trim code, D/A converter trim code, and sensor trim code) and address mapping information (e.g., updated address mapping information for I/O's and wordlines)—collectively referred to herein as "IC trim and redundancy information"—stored in NVM module 170. In some embodiments, the IC trim and redundancy information can be the combination of the trim code and the address mapping information and can be represented by any length of bits, such as by 64 bits, 128 bits, 256 bits, 512 bits, and 1024 bits. Due to the uniqueness of the IC trim and redundancy information—which depends on random physical factors introduced during the semiconductor manufacturing process—an output of PUF circuit 110 can be highly unpredictable and used as the unique device signature for memory device 100. This unique device signature can be used for security purposes, such as for device authentication to certify that memory device 100 can execute certain software and applications.

Figure 2:
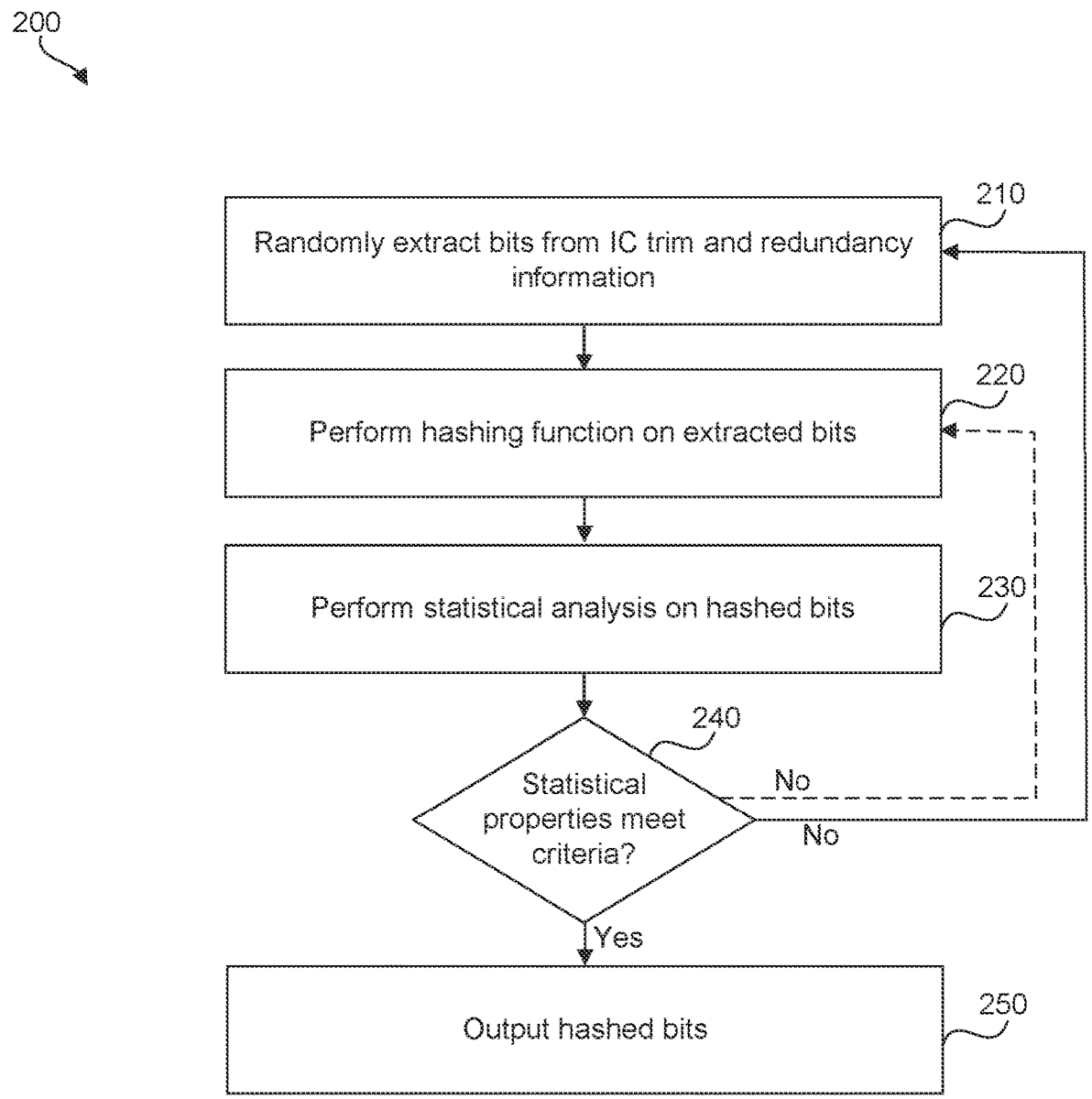
FIG. 2 is an illustration of a method for generating a device signature by a PUF circuit based on IC trim and redundancy information, according to some embodiments of the present disclosure.

FIG. 2 is an illustration of a method 200 for generating a device signature by PUF circuit 110 based on IC trim and redundancy information, according to some embodiments. For illustration purposes, the operations of method 200 will be described with reference to memory device 100 of FIG. 1. The operations can be performed by other types of IC devices, such as processors and ASICs. Further, the operations of method 200 can be performed in a different order or some of the operations may not be performed depending on specific applications.

In operation 210, bits are randomly extracted from the IC trim and redundancy information. In some embodiments, the IC trim and redundancy information can be stored in NVM module 170, in which PUF circuit 110 retrieves this information and performs operation 210. In some embodiments, to perform operation 210, PUF circuit 110 can include one or more circuits that have a linear feedback shift register (LFSR) based design, a multiplexer-based design, or a combination thereof. The LF SR-based design is described below with respect to FIGS. 3-5, the multiplexer-based design is described below with respect to FIGS. 6-8, and the multiplexer/LF SR-based design is described below with respect to FIGS. 9 and 10.

Figure 3:
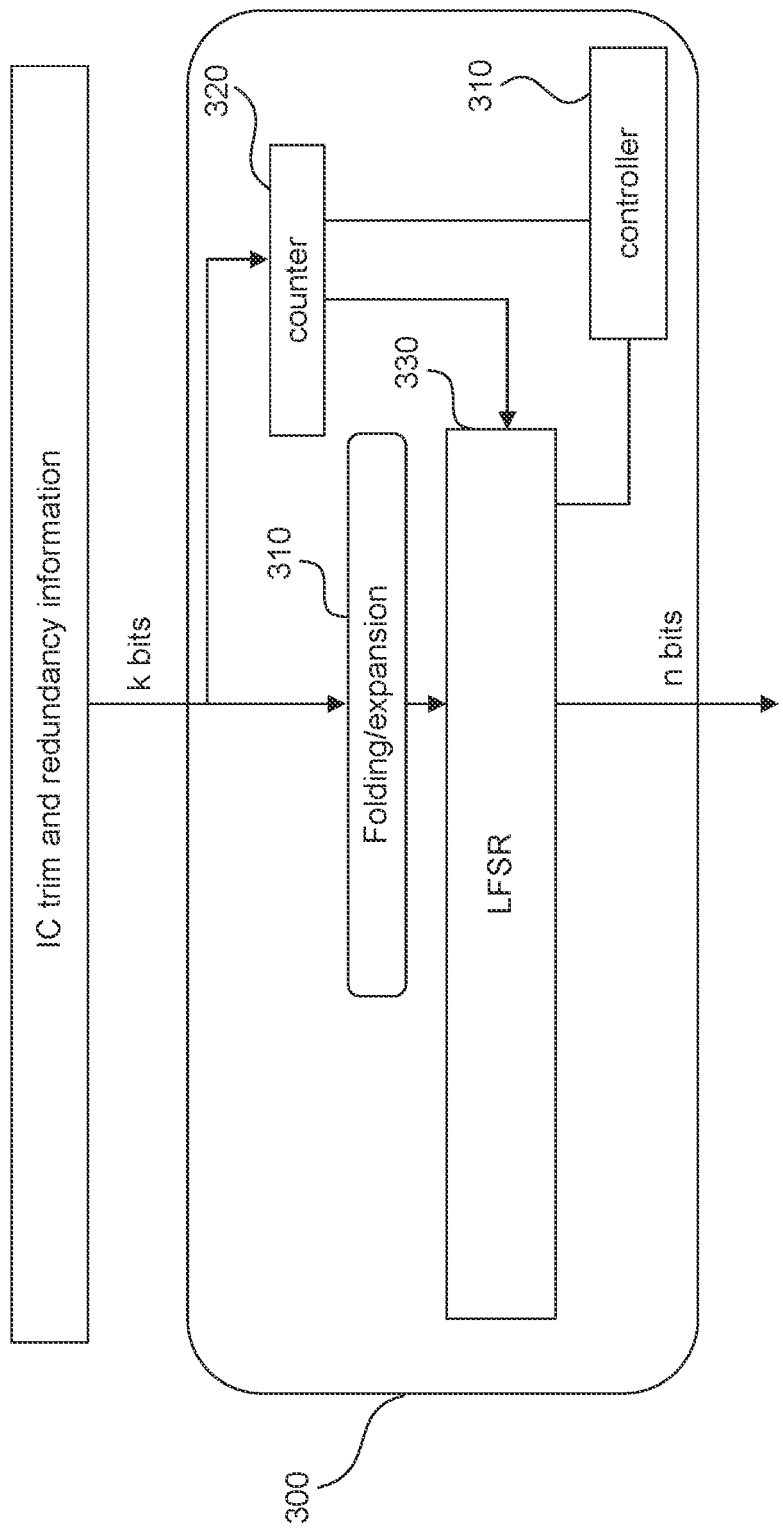
FIG. 3 is an illustration of a linear feedback shift register (LFSR) based circuit architecture that can be used to randomly extract bits from IC trim and redundancy information, according to some embodiments of the present disclosure.

FIG. 3 is an illustration of a LF SR-based circuit architecture 300 that can be used to randomly extract bits from the IC trim and redundancy information, according to some embodiments. LFSR-based circuit architecture 300 includes a folding/expansion module 310, a counter 320, an LFSR 330, and a controller 340. To facilitate in the description of LFSR-based circuit architecture 300, the IC trim and redundancy information has 'k' number of bits. As discussed above, the IC trim and redundancy information can be represented by any length of bits, in which the value of 'k' can be 64, 128, 256, 512, 1024, or any other suitable number.

Folding/expansion module 310 and counter 320 receive the IC trim and redundancy information from, for example, NVM module 170 of FIG. 1. In some embodiments, folding/expansion module 310 converts the 'k' number of bits in the IC trim and redundancy information into 'n' number of bits. The value of 'n' can be less than the value of 'k', in which folding/expansion module 310 can perform a folding algorithm to achieve the 'n' number of bits. Alternatively, the value of 'n' can be greater than the value of 'k', in which folding/expansion module 310 can perform an expansion algorithm to achieve the 'n' number of bits. Folding and expansion algorithms are well known, in which these algorithms are within the spirit and scope of this disclosure. Folding/expansion module 310 outputs the 'n' number of bits to LF SR 330.

In some embodiments, counter 320 extracts 'm' number of bits from the 'k' number of bits in the IC trim and redundancy information. The value of 'm' can be less than the value of 'k', according to some embodiments. The value of 'm' can be a preset number or a number that changes over time, according to some embodiments. The value associated with the 'm' number of bits extracted from the IC trim and redundancy information represents a count value for counter 320. For example, if 'k' has a value of 1024 and 'm' has a value of 512, counter 320 extracts 512 bits from the 1024 bits of IC trim and redundancy information. Counter 320 can extract the 512 bits from the IC trim and redundancy information using various methods: (i) counter 320 can extract the first 512 bits from the 1024 bits of the IC trim and redundancy information; (ii) counter 320 can extract the last 512 bits from the 1024 bits of the IC trim and redundancy information; (iii) counter 320 can extract every other bit from the 1024 bits of the IC trim and redundancy information for a total of 512 bits; (iv) counter 320 can randomly extract 512 bits from the 1024 bits of the IC trim and redundancy information; or (v) any other suitable extraction method. The numerical value corresponding to the digital representation of the extracted 512 bits is the count value for counter 320. Controller 340 controls the bit extraction operation performed by counter 320, according to some embodiments.

Figure 4:
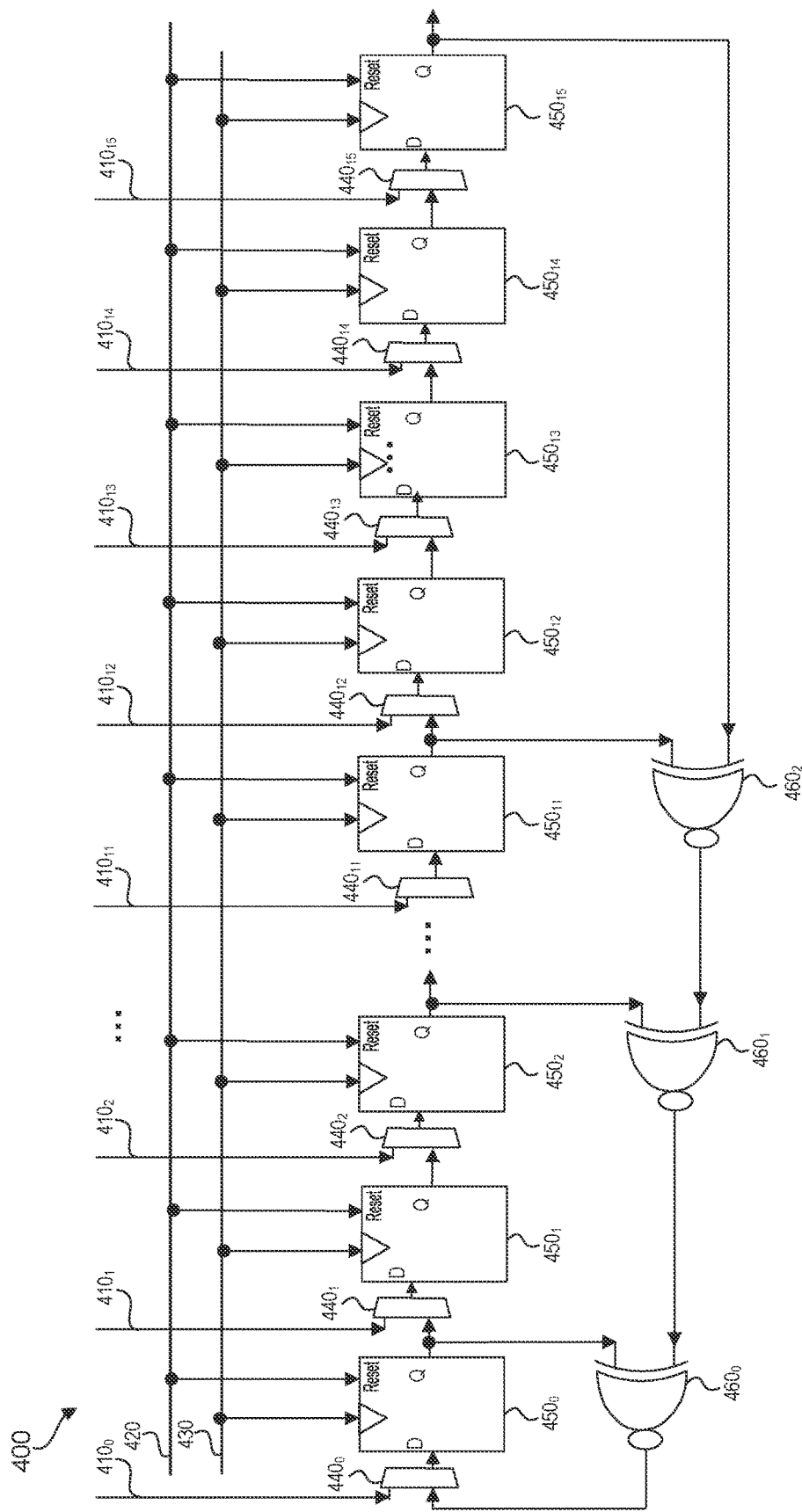
FIG. 4 is an illustration of a first LF SR that can be implemented in a LFSR-based circuit architecture, according to some embodiments of the present disclosure.
Figure 5:
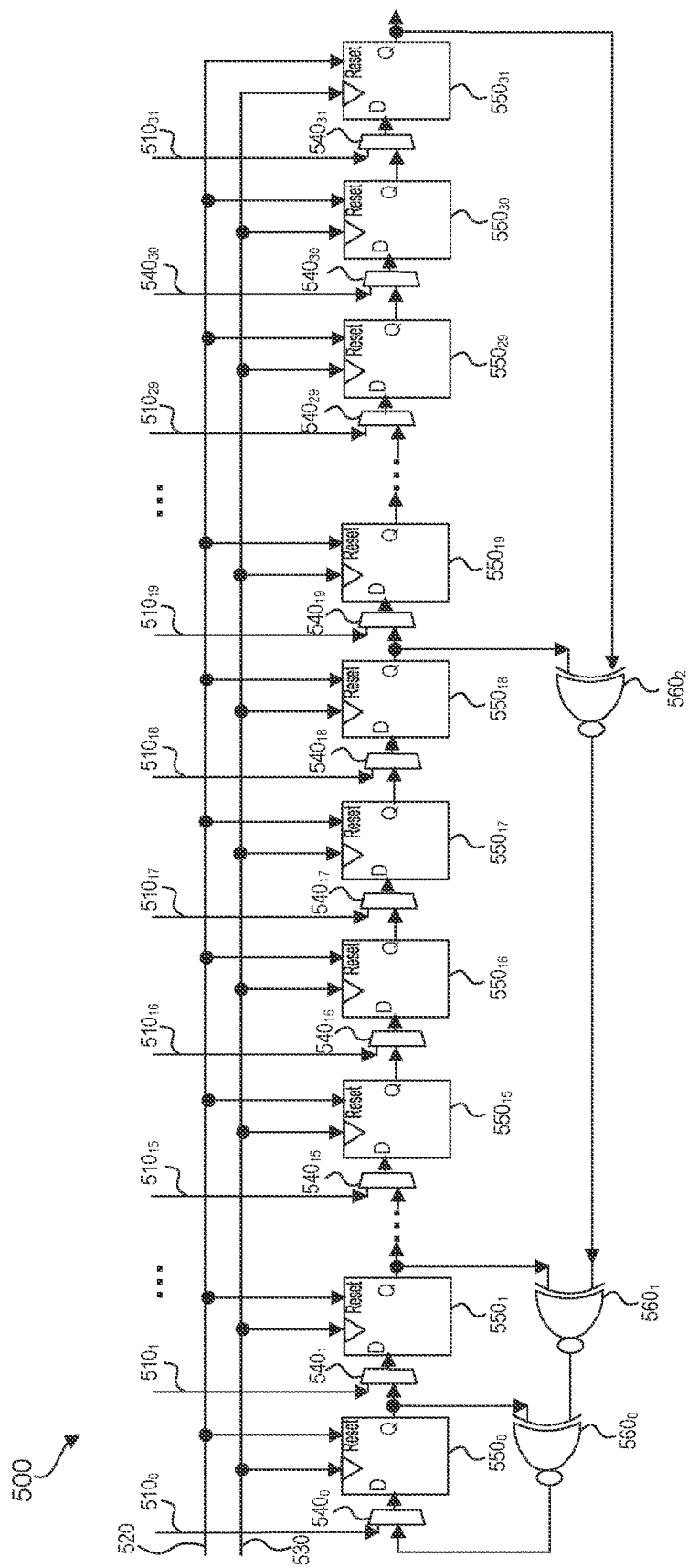
FIG. 5 is an illustration of a second LF SR that can be implemented in a LFSR-based circuit architecture, according to some embodiments of the present disclosure.

LFSR 330 receives the 'n' bits from folding/expansion module 310 as an initial value or a seed value and a clock signal 325 from counter 320, according to some embodiments. After the 'n' bits are loaded into LFSR 330, LFSR 330 can be cycled using clock signal 325 based on the count value stored in counter 320. For example, if the count value stored in counter 320 is '64', the 'n' bits loaded in LFSR 330 are cycled 64 times based on clock signal 325. LFSR 330 outputs the cycled 'n' bits, which represent the randomly extracted bits from the IC trim and redundancy information of operation 210. Controller 340 controls the cycle operation performed by LFSR 330, according to some embodiments. FIGS. 4 and 5 are illustrations of example LFSRs that can be implemented in LFSR-based circuit architecture 300.

FIG. 4 is an illustration of a 16-bit LFSR 400 that can be implemented in LFSR-based circuit architecture 300, according to some embodiments. LFSR 400 includes inputs $410_0$-$410_{15}$, a reset signal 420, a clock signal 430, multiplexers $440_0$-$440_{15}$, shift registers $450_0$-$450_{15}$, and XOR devices $460_0$-$460_2$. In some embodiments, each of shift registers $450_0$-$450_{15}$ can be a D flip-flop. Prior to loading LFSR 400 with an initial value or a seed value, shift registers $450_0$-$450_{15}$ can be initialized (e.g., to a logic low value, such as 0 V) using reset signal 420.

LFSR 400 can receive 16 bits (e.g., the 'n' bits from folding/expansion module 310) as an initial value or a seed value via inputs $410_0$-$410_{15}$ and load the 16 bits into multiplexers $440_0$-$440_{15}$, respectively. An output of XOR device $460_0$ serves as a select signal for multiplexer $440_0$. In some embodiments, if the output of XOR device $460_0$ is a '1' (e.g., a logic high value, such as a power supply voltage of memory device 100, which can be, for example, 1.5 V, 3.0 V, or 5.0 V), then the bit information (e.g., a logic high value or a logic low value) on input $410_0$ is passed to shift register $450_0$. In turn, when shift register $450_0$ is cycled based on clock signal 430, the bit information on input $410_0$ is passed to an output of shift register $450_0$. The output of shift register $450_0$ is received by multiplexer $440_1$ and functions as a select signal for the multiplexer (e.g., similar to the select signal for multiplexer $440_0$). The output of shift register $450_0$ is also received by XOR device $460_0$ as an input.

If the output of XOR device $460_0$ is a '0' (e.g., a logic low value, such as 0 V), then the bit information (e.g., a logic high value or a logic low value) on input $410_0$ is not passed to shift register $450_0$. In turn, when shift register $450_0$ is cycled based on clock signal 430, the initialized value in shift register $450_0$ is passed to the output of shift register $450_0$. Again, the output of shift register $450_0$ is received by multiplexer $440_1$ and functions as the select signal for the multiplexer (e.g., similar to the select signal for multiplexer $440_0$). The output of shift register $450_0$ is also received by XOR device $460o$ as an input.

Based on the inputs and outputs of multiplexers $440_0$-$440_{15}$, shift registers $450_0$-$450_{15}$, and XOR devices $460_0$-$460_2$, multiplexers $440_1$-$440_{15}$, shift registers $450_1$-$450_{15}$, and XOR devices $460_1$ and $460_2$ operate in a similar manner as multiplexer $440_0$, shift register $450_0$, and XOR device $460_0$ described above. After each cycle, the last multiplexer in the chain of multiplexers (e.g., multiplexer $450_{15}$) outputs a bit (e.g., a logic high value or a logic low value). After LFSR 400 completes the number of cycles associated with the count value stored in counter 320 of FIG. 3, LFSR 400 will have outputted its cycled bits (e.g., the cycled 'n' bits), which represent the randomly extracted bits from the IC trim and redundancy information of operation 210.

FIG. 5 is an illustration of a 32-bit LFSR 500 that can be implemented in LFSR-based circuit architecture 300, according to some embodiments. LFSR 500 includes inputs $510_0$-$510_{31}$, a reset signal 520, a clock signal 530, multiplexers $540_0$-$540_{31}$, shift registers $550_0$-$550_{31}$, and XOR devices $560_0$-$560_2$. In some embodiments, each of shift registers $550_0$-$550_{31}$ can be a D flip-flop. Prior to loading LFSR 500 with an initial value or a seed value, shift registers $550_0$-$550_{31}$ can be initialized (e.g., to a logic low value, such as 0 V) using reset signal 520.

Each of multiplexers $540_0$-$540_{31}$, shift registers $550_0$-$550_{31}$, and XOR devices $560_0$-$560_2$ operate in a similar as multiplexer 440, shift register 450, and XOR device 460, respectively, as described above with respect to FIG. 4. For example, LFSR 500 can receive 32 bits (e.g., the 'n' bits from folding/expansion module 310) as an initial value or a seed value via inputs $510_0$-$510_{31}$ and load the 32 bits into multiplexers $540_0$-$540_{31}$, respectively. Based on the inputs and outputs of multiplexers $540_0$-$540_{31}$, shift registers $550_0$-$550_{31}$, and XOR devices $560_0$-$560_2$ and after LFSR 500 completes the number of cycles associated with the count value stored in counter 320 of FIG. 3, LFSR 500 will have outputted its cycled bits (e.g., the cycled 'n' bits), which represent the randomly extracted bits from the IC trim and redundancy information of operation 210.

Based on the description herein, though FIGS. 4 and 5 show 16-bit and 32-bit LFSR designs, respectively, the number of bits for the LFSR design is not limited to these values and can have higher or lower LFSR bit designs, such as a 4-bit, a 64-bit, a 128-bit, and a 256-bit LFSR design.

Figure 6:
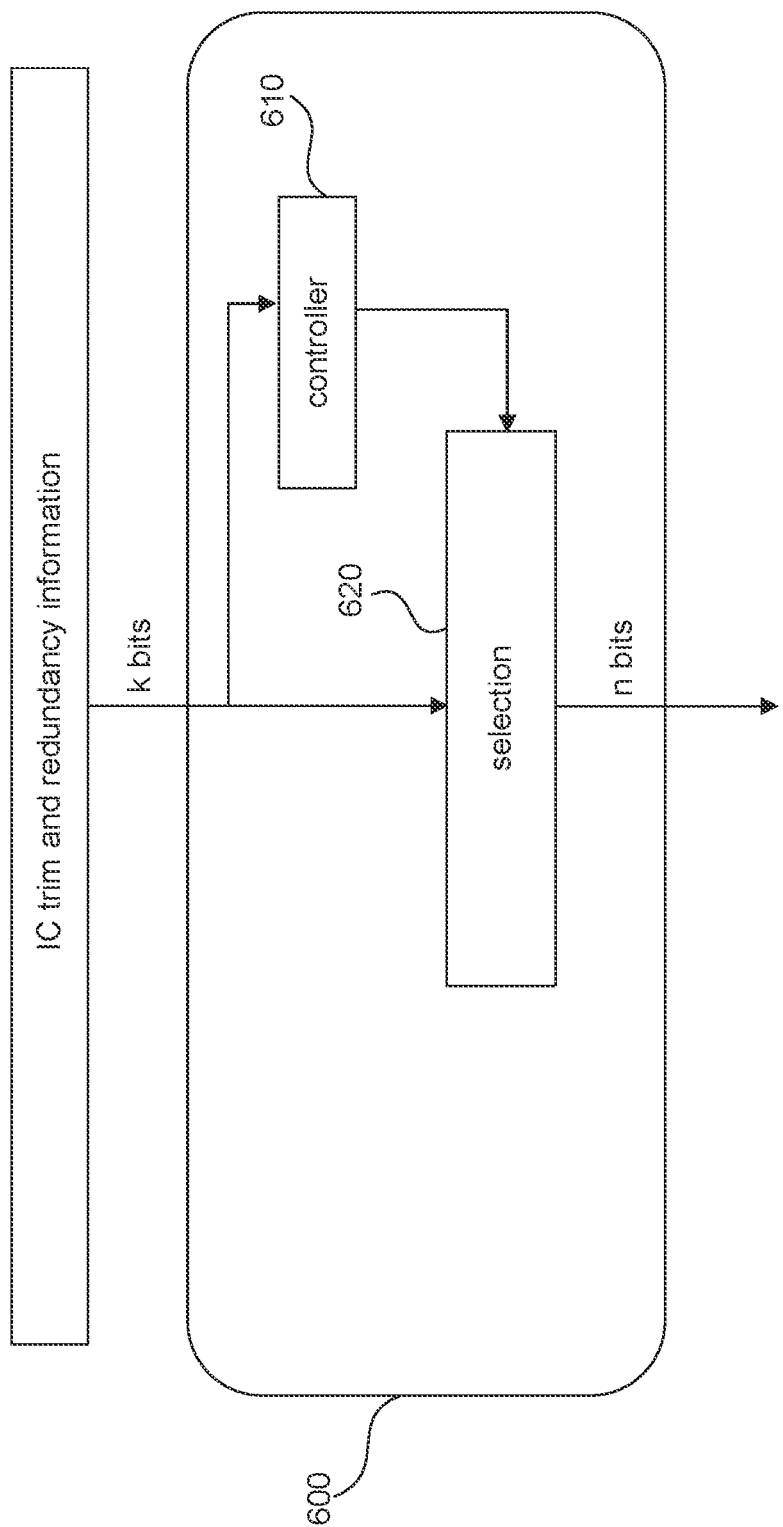
FIG. 6 is an illustration of a multiplexer-based circuit architecture that can be used to randomly extract bits from IC trim and redundancy information, according to some embodiments of the present disclosure.

FIG. 6 is an illustration of a multiplexer-based circuit architecture 600 that can be used to randomly extract bits from the IC trim and redundancy information, according to some embodiments. Multiplexer-based circuit architecture 600 includes a controller 610 and a selection module 620. To facilitate in the description of multiplexer-based circuit architecture 600, the IC trim and redundancy information has 'k' number of bits. As discussed above, the IC trim and redundancy information can be represented by any length of bits, in which the value of 'k' can be 64, 128, 256, 512, 1024, or any other suitable number.

Controller 610 and selection module 620 receive the IC trim and redundancy information from, for example, NVM module 170 of FIG. 1. Depending on the design of multiplexer-based circuit architecture 600, controller 610 can process a certain number of bits from the IC trim and redundancy information and pass these bits to selection module 620 for further processing. FIGS. 7-10 are illustrations of example selection modules that can be implemented in multiplexer-based circuit architecture 600.

Figure 7:
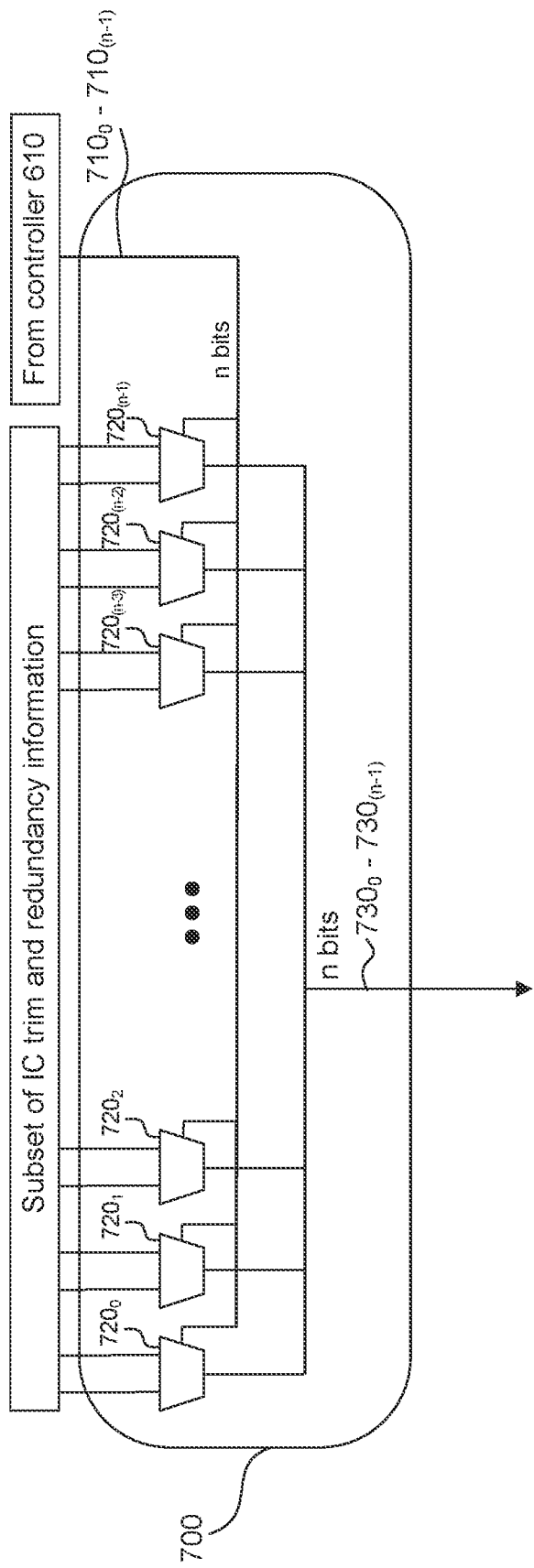
FIG. 7 is an illustration of a first selection module that can be implemented in a multiplexer-based circuit architecture, according to some embodiments of the present disclosure.

FIG. 7 is an illustration of a selection module 700 that can be implemented in multiplexer-based circuit architecture 600 of FIG. 6, according to some embodiments. Selection module 700 includes multiplexers $720_0$-$720_{(n-1)}$, in which the 'n' number of multiplexers is the same value as the 'n' number of bits outputted by controller 610 of FIG. 6. In some embodiments, each of multiplexers $720_0$-$720_{(n-1)}$ receives 2 bits from a subset of the 'k' bits of IC trim and redundancy information.

In some embodiments, controller 610 extracts 'n' number of bits from the 'k' number of bits in the IC trim and redundancy information. The value of 'n' can be less than the value of 'k', such as one-half of 'k', one-third of 'k', and one-fourth of 'k' (e.g., 'k/2', 'k/3', and 'k/4', respectively). For example, if 'k' has a value of 1024 and 'n' has a value of 341 (e.g., approximately 'k/3'), controller 610 extracts 341 bits from the 1024 bits of IC trim and redundancy information. Controller 610 can extract the 341 bits from the IC trim and redundancy information using various methods: (i) controller 610 can extract the first 341 bits from the 1024 bits of the IC trim and redundancy information; (ii) controller 610 can extract the last 341 bits from the 1024 bits of the IC trim and redundancy information; (iii) controller 610 can extract every third bit from the 1024 bits of the IC trim and redundancy information for a total of 341 bits; (iv) controller 610 can randomly extract 341 bits from the 1024 bits of the IC trim and redundancy information; or (v) any other suitable extraction method. The 'n' bits outputted by controller 610 can be used as selection signals for multiplexers $720_0$-$720_{(n-1)}$ in FIG. 7. In some embodiments, the value of 'n' can be a preset number based on the design of selection module 700.

The number of the subset of 'k' bits of IC trim and redundancy information can be twice the number of 'n' bits outputted by controller 610, according to some embodiments. In some embodiments, the subset of the 'k' bits of IC trim and redundancy information can be (i) randomly selected from the 'k' bits of IC trim and redundancy information, (ii) the first [2·'n'] number of bits of the 'k' bits of IC trim and redundancy information, (iii) the last [2·'n'] number of bits of the 'k' bits of IC trim and redundancy information, or (iv) selected in any suitable manner. For example, if 'k' has a value of 1024 and 'n' has a value of 341, then the number of the subset of 'k' bits of IC trim and redundancy information can be 682. In this example, the 682 bits from the IC trim and redundancy information can be (i) randomly selected from the 1024 bits of IC trim and redundancy information, (ii) the first 682 bits of the 1024 bits of IC trim and redundancy information, (iii) the last 682 bits of the 1024 bits of IC trim and redundancy information, or (iv) selected in any suitable manner.

In some embodiments, a first input of each of multiplexers $720_0$-$720_{(n-1)}$ can receive a bit value associated with an even bit index from the subset of 'k' bits of IC trim and redundancy information (e.g., a logic high value or a logic low value at bit indices 0, 2, 4, 6, 8, . . . 682) and a second input of each of multiplexers $720_0$-$720_{(n-1)}$ can receive a bit value associated with an odd bit index from the subset of 'k' bits of IC trim and redundancy information (e.g., a logic high value or a logic low value at bit indices 1, 3, 5, 7, 9, . . . 681). Based on the description herein, the subset of 'k' bits of IC trim and redundancy information can be mapped to the first and second inputs of multiplexers $720_0$-$720_{(n-1)}$ in any suitable manner.

Further, in some embodiments, each of the 'n' bits outputted by controller 610 corresponds to each of select signals $710_0$-$710_{(n-1)}$. Based on the values of select signals $710_0$-$710_{(n-1)}$ (e.g., a logic high value or a logic low value), multiplexers $720_0$-$720_{(n-1)}$ output either their first input or second input as outputs $730_0$-$730_{(n-1)}$, respectively. In some embodiments, outputs $730_0$-$730_{(n-1)}$ represent the randomly extracted bits from the IC trim and redundancy information of operation 210.

Figure 8:
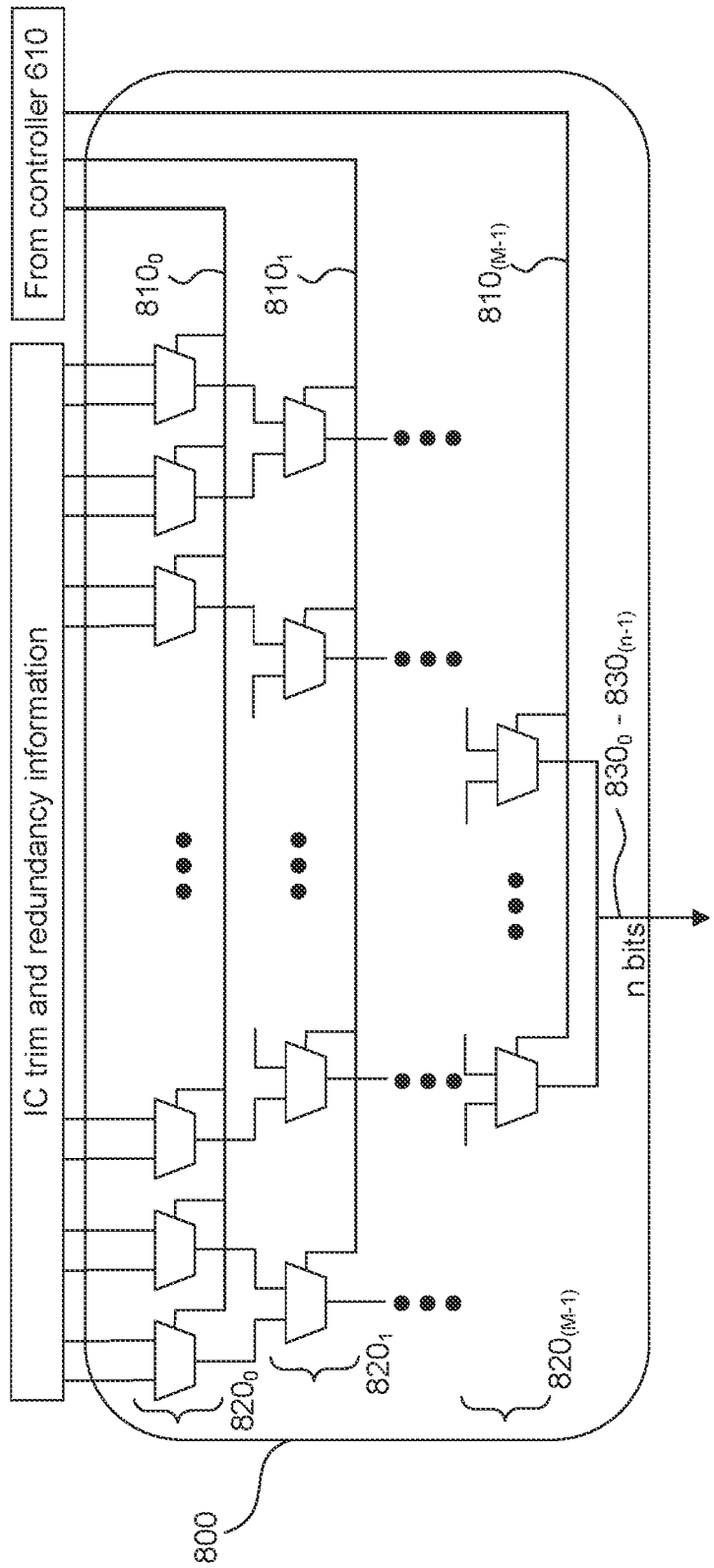
FIG. 8 is an illustration of a second selection module that can be implemented in a multiplexer-based circuit architecture, according to some embodiments of the present disclosure.

FIG. 8 is an illustration of another selection module 800 that can be implemented in multiplexer-based circuit architecture 600 of FIG. 6, according to some embodiments. In some embodiments, the number of 'k' bits of IC trim and redundancy information can be much greater than twice the number of 'n' bits outputted by controller 610 (e.g., 'k'>>[2 'n']), such as 3 times, 4 times, 5 times, or other magnitudes greater than twice the number of 'n' bits. In this instance, the multiplexer architecture shown in selection module 800 can be used.

In some embodiments, selection module 800 includes rows of multiplexers $820_0$-$820_{(M-1)}$, where 'M' represents a number of multiplexer rows and depends on the number of 'k' bits of IC trim and redundancy information and the number of 'n' bits outputted by controller 610. For example, 'n' can have a value of 64 and 'k' can have a value of 1024. Here, 'M' can have a value of 4—e.g., 4 rows of multiplexers. In this example, the first row of multiplexers can have 512 multiplexers, in which a first input of each of the multiplexers can receive a bit value associated with an even bit index from the 'k' bits of IC trim and redundancy information (e.g., a logic high value or a logic low value at bit indices 0, 2, 4, 6, 8, . . . 1024) and a second input of each of the multiplexers can receive a bit value associated with an odd bit index from the 'k' bits of IC trim and redundancy information (e.g., a logic high value or a logic low value at bit indices 1, 3, 5, 7, 9, . . . 1023). Based on the description herein, the 'k' bits of IC trim and redundancy information can be mapped to the first and second inputs of the multiplexers in any suitable manner. The second row of multiplexers can have 256 multiplexers, in which each of the multiplexers receives outputs from multiplexers in the first row as inputs. The third row of multiplexers can have 128 multiplexers, in which each of the multiplexers receives outputs from multiplexers in the second row as inputs (e.g., similar to the multiplexer inputs in the second row of multiplexers). The fourth row of multiplexers can have 64 multiplexers, in which each of the multiplexers receives outputs from multiplexers in the third row as inputs (e.g., similar to the multiplexer inputs in the third row of multiplexers).

Referring to FIG. 8, the multiplexers in each row of multiplexers $820_0$-$820_{(M-1)}$ can receive select signals $810_0$-$810_{(M-1)}$, respectively, from controller 610 of FIG. 6. The values of select signals $810_0$-$810_{(M-1)}$ can be mapped to the values (e.g., logic high values and logic low values) associated with an 'M' number of bits from the 'k' bits of IC trim and redundancy information, according to some embodiments. In some embodiments, the 'M' number of bits can be (i) randomly selected from the 'k' bits of IC trim and redundancy information, (ii) the first 'M' number of bits of the 'k' bits of IC trim and redundancy information, (iii) the last 'M' number of bits of the 'k' bits of IC trim and redundancy information, or (iv) selected in any suitable manner. Using the example above, where 'M' has a value of 4 and 'k' has a value of 1024, the 4 bits to be used as select signals $810_0$-$810_3$ can be (i) randomly selected from the 1024 bits of IC trim and redundancy information, (ii) the first 4 bits of the 1024 bits of IC trim and redundancy information, (iii) the last 4 bits of the 1024 bits of IC trim and redundancy information, or (iv) selected in any suitable manner. Based on the values of select signals $810_0$-$810_{(M-1)}$ (e.g., a logic high value or a logic low value), multiplexers in each of rows of multiplexers $820_0$-$820_{(M-1)}$ output either their first input or second input. The multiplexer outputs in row of multiplexer $820_{(M-1)}$ has 'n' number of bits and are represented as outputs $830_0$-$830_{(n-1)}$ in FIG. 8, which represent the randomly extracted bits from the IC trim and redundancy information of operation 210.

Figure 9:
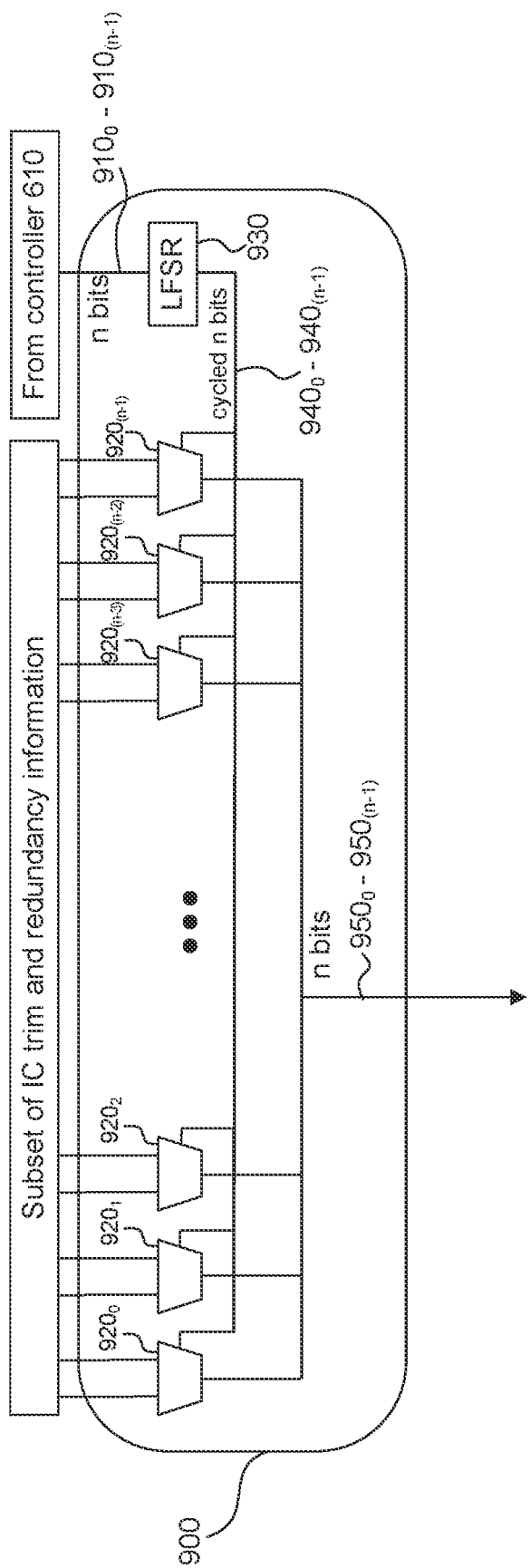
FIG. 9 is an illustration of a third selection module that can be implemented in a multiplexer-based circuit architecture, according to some embodiments of the present disclosure.

FIG. 9 is an illustration of another selection module 900 that can be implemented in multiplexer-based circuit architecture of FIG. 6, according to some embodiments. Selection module 900 includes multiplexers $920_0$-$920_{(n-1)}$ and a LFSR 930. The 'n' number of multiplexers is the same value as the 'n' number of bits outputted by controller 610 of FIG. 6. In some embodiments, each of multiplexers $920_0$-$920_{(n-1)}$ receives 2 bits from a subset of the 'k' bits of IC trim and redundancy information.

The number of the subset of 'k' bits of IC trim and redundancy information can be twice the number of 'n' bits outputted by controller 610, according to some embodiments. In some embodiments, the subset of the 'k' bits of IC trim and redundancy information can be (i) randomly selected from the 'k' bits of IC trim and redundancy information, (ii) the first [2 'n'] number of bits of the 'k' bits of IC trim and redundancy information, (iii) the last [2 'n'] number of bits of the 'k' bits of IC trim and redundancy information, or (iv) selected in any suitable manner. For example, if 'k' has a value of 1024 and 'n' has a value of 341, then the number of the subset of 'k' bits of IC trim and redundancy information can be 682. In this example, 682 bits from the IC trim and redundancy information can be (i) randomly selected from the 1024 bits of IC trim and redundancy information, (ii) the first 682 bits of the 1024 bits of IC trim and redundancy information, (iii) the last 682 bits of the 1024 bits of IC trim and redundancy information, or (iv) selected in any suitable manner.

In some embodiments, a first input of each of multiplexers $920_0$-$920_{(n-1)}$ can receive a bit value associated with an even bit index from the subset of 'k' bits of IC trim and redundancy information (e.g., a logic high value or a logic low value at bit indices 0, 2, 4, 6, 8, . . . 682) and a second input of each of multiplexers $720_0$-$720_{(n-1)}$ can receive a bit value associated with an odd bit index from the subset of 'k' bits of IC trim and redundancy information (e.g., a logic high value or a logic low value at bit indices 1, 3, 5, 7, 9, . . . 681). Based on the description herein, the subset of 'k' bits of IC trim and redundancy information can be mapped to the first and second inputs of multiplexers $920_0$-$920_{(n-1)}$ in any suitable manner.

LFSR 930 can receive the 'n' bits outputted by controller 610 (e.g., outputs $910_0$-$910_{(n-1)}$) as an initial value or a seed value, according to some embodiments. After the 'n' bits are loaded into LFSR 930, LF SR 930 can be cycled based on a predetermined number of cycles, according to some embodiments. LFSR 930 outputs the cycled 'n' bits as select signals $940_0$-$940_{(n-1)}$ for multiplexers $920_0$-$920_{(n-1)}$, respectively. Example implementations of LFSR 930 are described above with respect to 16-bit LF SR 400 of FIG. 4 and 32-bit LFSR 500 of FIG. 5. Other implementations of LF SR 930 are within the spirit and scope of the present disclosure.

Based on the values of select signals $940_0$-$940_{(n-1)}$ (e.g., a logic high value or a logic low value), multiplexers $920_0$-$920_{(n-1)}$ output either their first input or second input as outputs $950_0$-$950_{(n-1)}$, respectively. In some embodiments, outputs $950_0$-$950_{(n-1)}$ represent the randomly extracted bits from the IC trim and redundancy information of operation 210.

Figure 10:
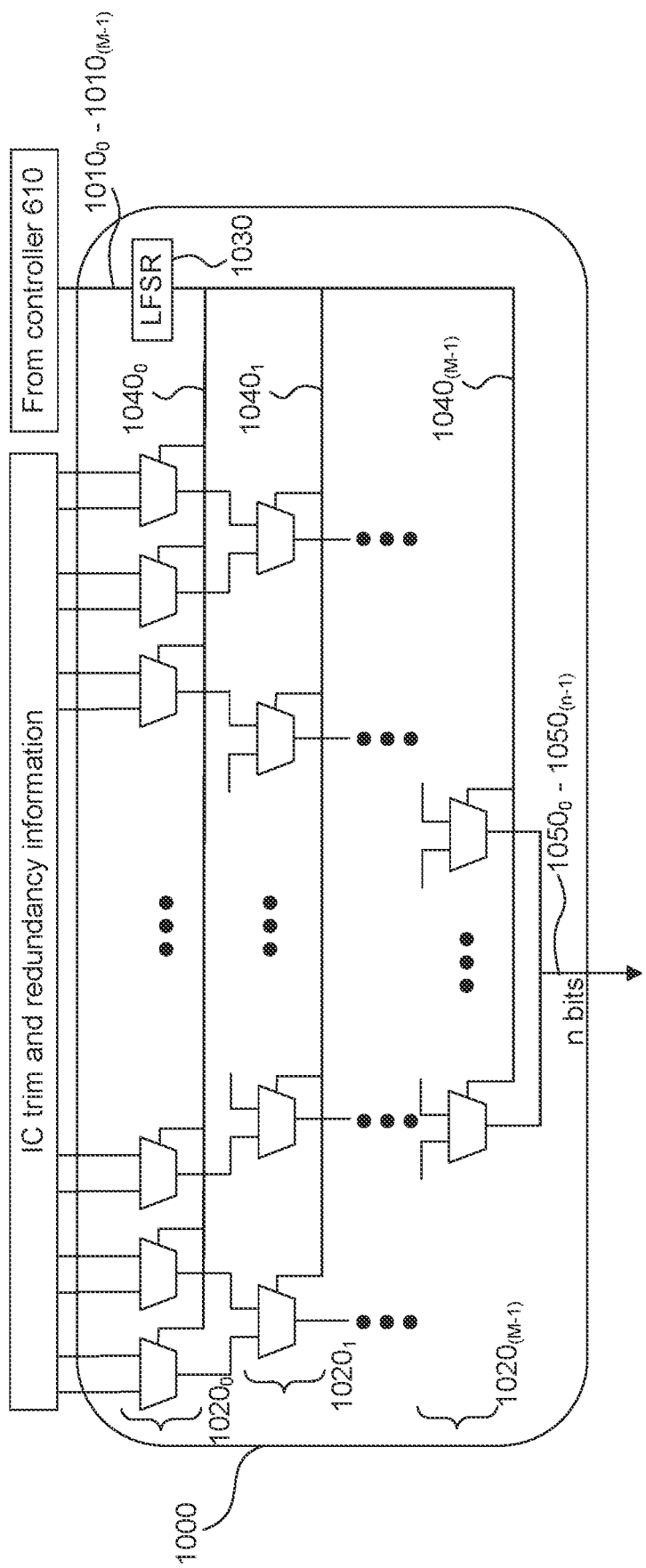
FIG. 10 is an illustration of a fourth selection module that can be implemented in a multiplexer-based circuit architecture, according to some embodiments of the present disclosure.

FIG. 10 is an illustration of another selection module 1000 that can be implemented in multiplexer-based circuit architecture 600 of FIG. 6, according to some embodiments. In some embodiments, the number of 'k' bits of IC trim and redundancy information can be much greater than twice the number of 'n' bits outputted by controller 610 (e.g., 'k'>>[2 'n']), such as 3 times, 4 times, 5 times, or other magnitudes greater than twice the number of 'n' bits. In this instance, the multiplexer architecture shown in selection module 1000 can be used.

In some embodiments, selection module 1000 includes rows of multiplexers $1020_0$-$1020_{(M-1)}$, where 'M' represents a number of multiplexer rows and depends on the number of 'k' bits of IC trim and redundancy information and the number of 'n' bits outputted by controller 610. For example, 'n' can have a value of 64 and 'k' can have a value of 1024. Here, 'M' can have a value of 4—e.g., 4 rows of multiplexers. In this example, the first row of multiplexers can have 512 multiplexers, in which a first input of each of the multiplexers can receive a bit value associated with an even bit index from the 'k' bits of IC trim and redundancy information (e.g., a logic high value or a logic low value at bit indices 0, 2, 4, 6, 8, . . . 1024) and a second input of each of the multiplexers can receive a bit value associated with an odd bit index from the 'k' bits of IC trim and redundancy information (e.g., a logic high value or a logic low value at bit indices 1, 3, 5, 7, 9, . . . 1023). Based on the description herein, the 'k' bits of IC trim and redundancy information can be mapped to the first and second inputs of the multiplexers in any suitable manner. The second row of multiplexers can have 256 multiplexers, in which each of the multiplexers receives outputs from multiplexers in the first row as inputs (e.g., similar to the multiplexer inputs in row of multiplexers $1020_1$). The third row of multiplexers can have 128 multiplexers, in which each of the multiplexers receives outputs from multiplexers in the second row as inputs (e.g., similar to the multiplexer inputs in the second row of multiplexers). The fourth row of multiplexers can have 64 multiplexers, in which each of the multiplexers receives outputs from multiplexers in the third row as inputs (e.g., similar to the multiplexer inputs in the third row of multiplexers).

LFSR 1030 can receive an 'M' number of bits extracted from the 'k' bits of IC trim and redundancy information as an initial value or a seed value, according to some embodiments. LFSR 1030 can receive the extracted 'M' number of bits from controller 610 of FIG. 6 (e.g. outputs $1010_0$-$1010_{(M-1)}$). Controller 610 can extract the 'M' number of bits from the IC trim and redundancy information using various methods: (i) the first 'M' number of bits from the 'k' bits of the IC trim and redundancy information can be extracted; (ii) the last 'M' number of bits from the 'k' bits of the IC trim and redundancy information can be extracted; (iii) the 'M' number of bits can be randomly extracted from the 'k' bits of the IC trim and redundancy information; or (iv) using any other suitable extraction method. After the 'M' number of bits extracted from the 'k' bits of IC trim and redundancy information are received from controller 610, LFSR 1030 can be cycled based on a predetermined number of cycles, according to some embodiments. LFSR 1030 outputs the cycled extracted bits as select signals $1040_0$-$1040_{(M-1)}$ for multiplexers in rows of multiplexers $1020_0$-$1020_{(M-1)}$, respectively. Example implementations of LFSR 1030 are described above with respect to 16-bit LF SR 400 of FIG. 4 and 32-bit LFSR 500 of FIG. 5. Other implementations of LFSR 1030 are within the spirit and scope of the present disclosure.

Based on the values of select signals $1040_0$-$1040_{(M-1)}$ (e.g., a logic high value or a logic low value), multiplexers in each of rows of multiplexers $1020_0$-$1020_{(M-1)}$ output either their first input or second input. The multiplexer outputs in row of multiplexer $1020_{(M-1)}$ has 'n' number of bits and are represented as outputs $1050_0$-$1050_{(n-1)}$ in FIG. 10, which represent the randomly extracted bits from the IC trim and redundancy information of operation 210.

Referring to FIG. 2, in operation 220, a hashing function is performed on the randomly extracted bits from the IC trim and redundancy information to generate hashed bits. In some embodiments, the hashing function can be a cryptographic hashing function, such as a secure hash algorithm (SHA), an SHA-2, an SHA-3, an XOR tree hash on the randomly extracted bits, and a combination thereof.

Figure 11:
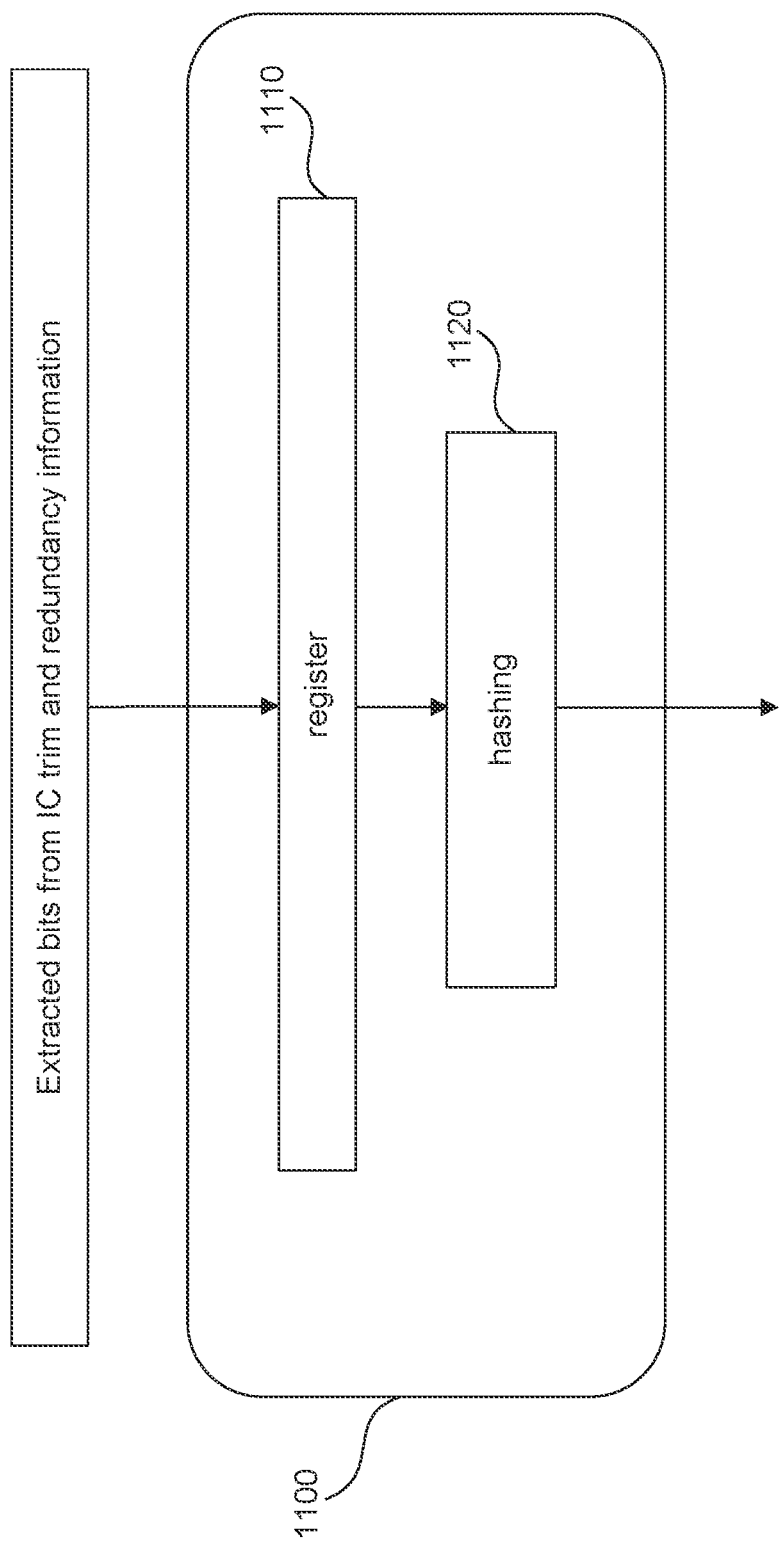
FIG. 11 is an illustration of a hashing circuit that can be implemented in a PUF circuit, according to some embodiments of the present disclosure.

FIG. 11 is an illustration of a hashing circuit 1100 that can be implemented in PUF circuit 110 of FIG. 1 to perform the hashing function of operation 220, according to some embodiments. Hashing circuit 1100 includes a register 1110 and a hashing module 1120. In some embodiments, register 1110 receives the randomly extracted bits from the IC trim and redundancy information (from operation 210) and stores this information. Register 1110 can receive the randomly extracted bits from the IC trim and redundancy information from the outputs of LFSR-based circuit architecture 300 of FIG. 3 or multiplexer-based circuit architecture 600 of FIG. 6, according to some embodiments. Hashing module 1120 can perform a hashing function—e.g., an SHA, an SHA-2, an SHA-3, an XOR tree hash on the randomly extracted bits, or a combination thereof—on the information stored in register 1110 to generate the hashed bits. Other types hashing functions are within the spirit and scope of the present disclosure. In some embodiments, the type of hashing function performed by hashing module 120 can depend on a security requirement of an IC implementing PUF circuit 110.

Referring to FIG. 2, in operation 230, a statistical analysis is performed on the hashed bits. PUF circuit 110 of FIG. 1 can include one or more processors to perform the statistical analysis of operation 230. In some embodiments, the statistical analysis includes a Hamming weight analysis on the hashed bits, an inter-Hamming distance (HD) analysis on the hashed bits, an intra-HD analysis on the hashed bits, an autocorrelation operation on the hashed bits, or a combination thereof. The Hamming weight analysis can be used to determine the percentage of 1's (e.g., logic high values) and 0's (e.g., logic low values) in the hashed bits (from operation 220), according to some embodiments.

In some embodiments, the inter-HD analysis can be used to measure a degree of randomness between hashed bits (from operation 220) when multiple challenges are issued to PUF circuit 110. For example, if first IC trim and redundancy information is inputted into PUF circuit 110 of FIG. 1 (e.g., a first challenge), PUF circuit 110 generates a first set of hashed bits. If second IC trim and redundancy information—which is different from the first IC trim and redundancy information—is inputted into PUF circuit 110, PUF circuit 110 generates a second set of hashed bits. The first and second sets of hashed bits can be compared to each other to determine the degree of randomness.

In some embodiments, the intra-HD analysis can be used to measure a degree of randomness in the hashed bits (from operation 220) when the same challenge is issued to PUF circuit 110. For example, if the same first trim and redundancy information is inputted into PUF circuit 110 (e.g., challenge) multiple times, PUF circuit 110 should generate the same hashed bits each time. If the hashed bits are different among the different times the same first trim and redundancy information is inputted into PUF circuit 110, the degree of randomness can be determined.

In some embodiments, the autocorrelation operation can be used to measure a degree of similarity between the hashed bits (from operation 220) of a challenge and the hashed bits (from operation 220) of a time-delay version of the same challenge, when both challenges are issued to PUF circuit 110. For example, if first IC trim and redundancy information is inputted into PUF circuit 110 of FIG. 1 (e.g., a challenge), PUF circuit 110 generates a first set of hashed bits. If second IC trim and redundancy information—which is a time-delayed version of the first IC trim and redundancy information (e.g., time-delayed version of the challenge)—is inputted into PUF circuit 110, PUF circuit 110 generates a second set of hashed bits. In some embodiments, the time-delayed version of the first IC trim and redundancy information can be represented by a bit offset (e.g., a 2-bit offset, a 4-bit offset, a 16-bit offset, and a 32-bit offset) of first IC trim and redundancy information. The first and second sets of hashed bits can be compared to each other to determine the degree of similarity.

Referring to FIG. 2, in operation 240, a determination is made on whether statistical properties of the hashed bits meet one or more criteria. PUF circuit 110 of FIG. 1 can include one or more processors to perform the determination of operation 240. In some embodiments, operation 240 determines whether the hashed bits meet one or criteria associated with one or more of the Hamming weight analysis on the hashed bits, inter-HD analysis on the hashed bits, intra-HD analysis on the hashed bits, and autocorrelation operation on the hashed bits performed in operation 230.

In some embodiments, a criterion for the Hamming weight analysis on the hashed bits can be whether the percentage of 1's (e.g., logic high values) in the hashed bits is within a predetermined range, such as between 45% and 55%, between 40% and 60%, and between 35% and 65%. In some embodiments, a criterion for the inter-HD analysis on the hashed bits can be whether at least a predetermined percentage of bits (e.g., at least 50% of bits) are flipped—from '1' to '0' or from '0' to '1'—when comparing a first set of hashed bits from a first challenge to a second set of hashed bits from a second challenge. As discussed above, the first and second challenges are different from each other and inputted into PUF circuit 110. In some embodiments, a criterion for the intra-HD analysis on the hashed bits can be whether a predetermined percentage of bits (e.g., 0% of bits or no bits) are flipped when the same challenge is issued to PUF circuit 110. In some embodiments, a criterion for the autocorrelation operation on the hashed bits can be whether a predetermined percentage of bits (e.g., 0% of bits or no bits) are flipped when comparing a first set of hashed bits from a challenge to a second set of hashed bits from a time-delayed version of the challenge.

In some embodiments, if the statistical properties of the hashed bits fail to meet the one or more criteria, method 200 repeats operations 210, 220, 230, and 240 (as shown by the solid arrow in FIG. 2). For example, if the statistical properties of the hashed bits are outside the predetermined percentage range of the Hamming weight analysis, below the predetermined percentage of bits that are flipped from the inter-HD analysis, above the predetermined percentage of bits that are flipped from the intra-HD analysis, and/or above the predetermined percentage of bits that are flipped from the autocorrelation operation, then the hashed bits fail to meet the one or more criteria. Alternatively, in some embodiments, if the statistical properties of the hashed bits fail to meet the one or more criteria, method 200 repeats operations 220, 230, and 240 (as shown by the dashed arrow in FIG. 2).

Referring to FIG. 2, if statistical properties of the hashed bits meet the one or more criteria, in operation 240, method 200 proceeds to operation 250. In operation 250, the hashed bits are outputted by PUF circuit 110 to represent the device signature of memory device 100, according to some embodiments.

Embodiments of the present disclosure describe an IC device with a PUF circuit. In some embodiments, the PUF circuit is configured to generate a device signature based on IC trim and redundancy information. The IC trim and redundancy information can be based on one or more of I/O circuit repair information, sense amplifier trim information, a physical address associated with a repaired wordline in a memory device, a physical address associated with a repaired bitline in the memory device, A/D converter trim information, D/A trim information, sensor trim information, any other IC trim and redundancy information, or a combination thereof, according to some embodiments. A benefit of the embodiments described herein, among others, is the low overhead of the PUF circuit since the information used to generate the device signature is based on existing IC trim and redundancy information unique to the IC device.

Embodiments of the present disclosure include a device with memory and a processor. The memory is configured to store IC trim and redundancy information. The processor is configured to extract bits from the IC trim and redundancy information, perform a hashing function on the extracted bits to generate hashed bits, and in response to statistical properties of the hashed bits meeting one or more criteria, output the hashed bits. In some embodiments, the memory that stores the IC trim and redundancy information can be different from other memory used by the device for other operations (e.g., accessing user data and program data that have been written into system memory).

Embodiments of the present disclosure include a method that stores trim and redundancy information associated with an integrated circuit; retrieves the trim and redundancy information to extract bits from the trim and redundancy information; and performs a hashing function on the extracted bits to generate hashed bits. The method also includes, in response to statistical properties of the hashed bits meeting one or more criteria, outputting the hashed bits.

Embodiments of the present disclosure include a system with the non-volatile memory device and a physical unclonable function (PUF) circuit. The non-volatile memory device configured to store integrated circuit (IC) trim and redundancy information. The PUF circuit configured to: retrieve the IC trim and redundancy information from the non-volatile memory device; extract bits from the IC trim and redundancy information; perform a hashing function on the extracted bits to generate hashed bits; in response to statistical properties of the hashed bits meeting one or more criteria, output the hashed bits; and in response to the statistical properties of the hashed bits failing to meet the one or more criteria, repeat one or more of the extracting bits from the IC trim and redundancy information and the performing the hashing function on the extracted bits to generate the hashed bits. In some embodiments, the non-volatile memory that stores the IC trim and redundancy information can be different from other memory used by the system for other operations (e.g., accessing user data and program data that have been written into system memory).

It is to be appreciated that the Detailed Description section, and not the Abstract section, is intended to be used to interpret the claims. The Abstract section may set forth one or more but not all possible embodiments of the present disclosure as contemplated by the inventor(s), and thus, are not intended to limit the subjoined claims in any way.

The foregoing disclosure outlines features of several embodiments so that those skilled in the art may better understand the aspects of the present disclosure. Those skilled in the art will appreciate that they may readily use the present disclosure as a basis for designing or modifying other processes and structures for carrying out the same purposes and/or achieving the same advantages of the embodiments introduced herein. Those skilled in the art will also realize that such equivalent constructions do not depart from the spirit and scope of the present disclosure, and that they may make various changes, substitutions, and alterations herein without departing from the spirit and scope of the present disclosure.

What is claimed is:

1. An integrated circuit, comprising:
one or more circuits;
one or more interconnect routings;
a trim circuit configured to adjust one or more operational characteristics of the one or more circuits based on trim information comprising one or more tuning parameters of the adjusted one or more operational characteristics;
a redundancy circuit configured to replace one or more defective portions of the one or more interconnect routings based on redundancy information comprising an address mapping of the replaced one or more defective portions; and
a processor configured to:
extract bits from the trim and redundancy information;
perform a hashing function on the extracted bits to generate hashed bits; and
in response to statistical properties of the hashed bits meeting one or more criteria, output the hashed bits.

2. The integrated circuit of claim 1, wherein the one or more circuits comprise one or more of a sense amplifier, an analog-to-digital converter, a digital-to-analog converter, and a sensor.

3. The integrated circuit of claim 1, wherein the trim information comprises one or more of a subset of sense amplifier trim information, a subset of analog-to-digital converter trim information, a subset of digital-to-analog trim information, and a subset of sensor trim information.

4. The integrated circuit of claim 1, wherein the one or more interconnect routings comprise one or more of an input/output line, a wordline, and a bitline.

5. The integrated circuit of claim 1, wherein the redundancy information comprises one or more of a subset of input/output circuit repair information, a subset of a physical address associated with a repaired wordline in a memory device, and a subset of a physical address associated with a repaired bitline in the memory device.

6. The integrated circuit of claim 1, wherein to perform the hashing function on the extracted bits, the processor is further configured to perform a cryptographic hashing function on the extracted bits to generate the hashed bits.

7. The integrated circuit of claim 6, wherein the cryptographic hashing function comprises one or more of a secure hash algorithm (SHA), an SHA-2, an SHA-3, an XOR tree hash on the extracted bits.

8. The integrated circuit of claim 1, wherein to output the hashed bits, the processor is further configured to determine the statistical properties of the hashed bits based on one or more of a Hamming weight analysis on the hashed bits, an inter-Hamming distance (HD) analysis on the hashed bits, an intra-HD analysis on the hashed bits, and an autocorrelation operation on the hashed bits.

9. The integrated circuit of claim 1, wherein the processor is further configured to, in response to the statistical properties of the hashed bits failing to meet the one or more criteria, repeat one or more of the extracting bits from the trim and redundancy information and the performing the hashing function on the extracted bits to generate other hashed bits.

10. A method, comprising:
adjusting operational characteristics of one or more circuits based on trim information comprising one or more tuning parameters of the adjusted one or more operational characteristics;
replacing one or more defective portions of one or more interconnect routings based on redundancy information comprising an address mapping of the replaced one or more defective portions;
performing a hashing function on bits extracted from the trim and redundancy information to generate hashed bits; and
in response to statistical properties of the hashed bits meeting one or more criteria, outputting the hashed bits.

11. The method of claim 10, further comprising retrieving the trim and redundancy information to extract the bits, wherein the retrieving comprises:
initializing a linear feedback shift register (LFSR) with a first subset of the trim and redundancy information;
cycling the LFSR based on a value associated with a second subset of the trim and redundancy information, wherein the second subset is different from the first subset of the trim and redundancy information; and
outputting contents of the cycled LFSR to generate the extracted bits.

12. The method of claim 10, further comprising retrieving the trim and redundancy information to extract the bits, wherein the retrieving comprises:
inputting a first subset of the trim and redundancy information into multiplexer circuits; and
selecting an output of each of the multiplexer circuits based on a second subset of the trim and redundancy information to generate the extracted bits, wherein a number of bits in the second subset is half of that in the first subset of the trim and redundancy information.

13. The method of claim 10, wherein the one or more circuits comprise one or more of a sense amplifier, an analog-to-digital converter, a digital-to-analog converter, and a sensor.

14. The method of claim 10, wherein the trim information comprises one or more of a subset of sense amplifier trim information, a subset of analog-to-digital converter trim information, a subset of digital-to-analog trim information, and a subset of sensor trim information.

15. The method of claim 10, wherein the one or more interconnect routings comprise one or more of an input/output line, a wordline, and a bitline.

16. The method of claim 10, wherein the redundancy information comprises one or more of a subset of input/output circuit repair information, a subset of a physical address associated with a repaired wordline in a memory device, and a subset of a physical address associated with a repaired bitline in the memory device.

17. A system, comprising:
one or more circuits;
one or more interconnect routings;
a trim circuit configured to adjust one or more operational characteristics of the one or more circuits based on trim information comprising one or more tuning parameters of the adjusted one or more operational characteristics;
a redundancy circuit configured to replace one or more defective portions of the one or more interconnect routings based on redundancy information comprising an address mapping of the replaced one or more defective portions; and a physical unclonable function (PUF) circuit configured to:
  perform a hashing function on bits extracted from the trim and redundancy information to generate hashed bits; and
  in response to statistical properties of the hashed bits meeting one or more criteria, output the hashed bits.

18. The system of claim 17, wherein the PUF circuit is further configured to, in response to the statistical properties of the hashed bits failing to meet the one or more criteria, repeat the performing the hashing function on other bits extracted from the trim and redundancy information to generate other hashed bits.

19. The system of claim 17, wherein:
the one or more circuits comprise one or more of a sense amplifier, an analog-to-digital converter, a digital-to-analog converter, and a sensor; and
the one or more interconnect routings comprise one or more of an input/output line, a wordline, and a bitline.

20. The system of claim 17, wherein the trim and redundancy information comprises one or more of a subset of input/output circuit repair information, a subset of sense amplifier trim information, a subset of a physical address associated with a repaired wordline in a memory device, a subset of a physical address associated with a repaired bitline in the memory device, a subset of analog-to-digital converter trim information, a subset of digital-to-analog trim information, and a subset of sensor trim information.

* * * * *